United States Patent [19]

Edwards et al.

[11] Patent Number: 5,316,017
[45] Date of Patent: May 31, 1994

[54] MAN-MACHINE INTERFACE FOR A JOINT MEASUREMENT SYSTEM

[75] Inventors: Glenn R. Edwards, Palo Alto; Graham Lloyd, Fremont; Marl L. Oberman, Sunnyvale, all of Calif.

[73] Assignee: Greenleaf Medical Systems, Inc., Palo Alto, Calif.

[21] Appl. No.: 957,716

[22] Filed: Oct. 7, 1992

[51] Int. Cl.⁵ ............................................. A61B 5/00
[52] U.S. Cl. ................................................... 128/782
[58] Field of Search ............................. 128/774, 782; 340/365 R

[56] References Cited

U.S. PATENT DOCUMENTS

| | | | |
|---|---|---|---|
| 4,414,537 | 11/1983 | Grimes | 340/365 R |
| 4,444,205 | 4/1984 | Jackson | 128/782 |
| 4,542,291 | 9/1985 | Zimmerman | 250/231 R |
| 4,715,235 | 12/1987 | Fukui et al. | 128/782 |
| 4,986,280 | 1/1991 | Marcus et al. | 128/774 |
| 5,047,952 | 9/1991 | Kramer et al. | 364/513.5 |
| 5,086,785 | 2/1992 | Gentile et al. | 128/782 |
| 5,166,462 | 11/1992 | Suzuki et al. | 128/782 |

FOREIGN PATENT DOCUMENTS

| | | | |
|---|---|---|---|
| 0115620A2 | 8/1984 | European Pat. Off. | |
| 0219501 | 11/1985 | Japan | 128/782 |
| 8601588 | 3/1986 | PCT Int'l Appl. | 128/774 |

Primary Examiner—Max Hindenburg
Attorney, Agent, or Firm—Kirkpatrick & Lockhart

[57] ABSTRACT

A man-machine interface comprises a sensor having first and second ends. The sensor carriers four transducers oriented therearound such that the sensor is responsive to flex in two directions. An affixing mechanism, such as a glove or cloth strap, is provided for affixing the man-machine interface to a patient's body. A first mounting mechanism is provided for rigidly mounting the first end of the sensor to the affixing mechanism. A second mounting mechanism is provided for slidably mounting a second end of the sensor to the affixing mechanism. In that manner, flex in two directions can be sensed without adding any tensile forces to the sensor as a result of the joint being flexed.

14 Claims, 8 Drawing Sheets

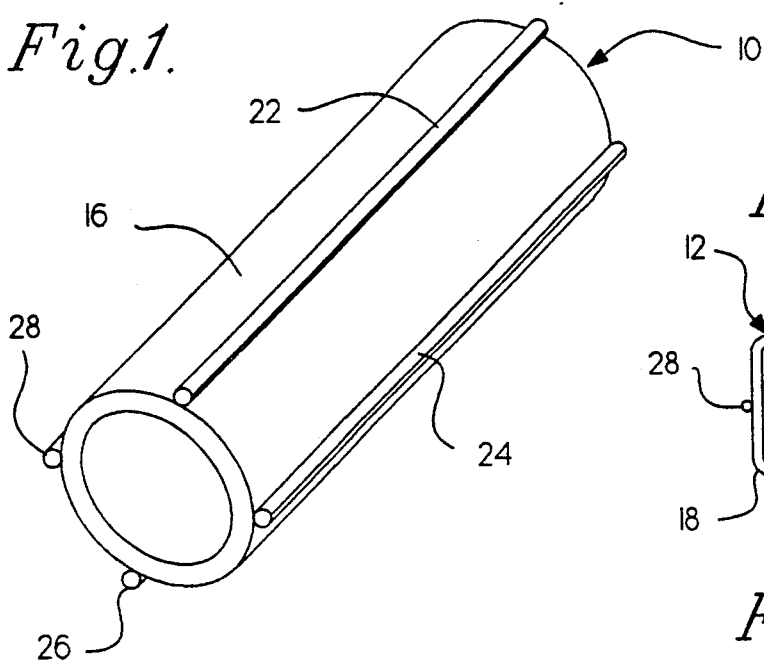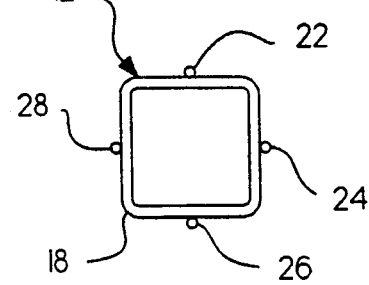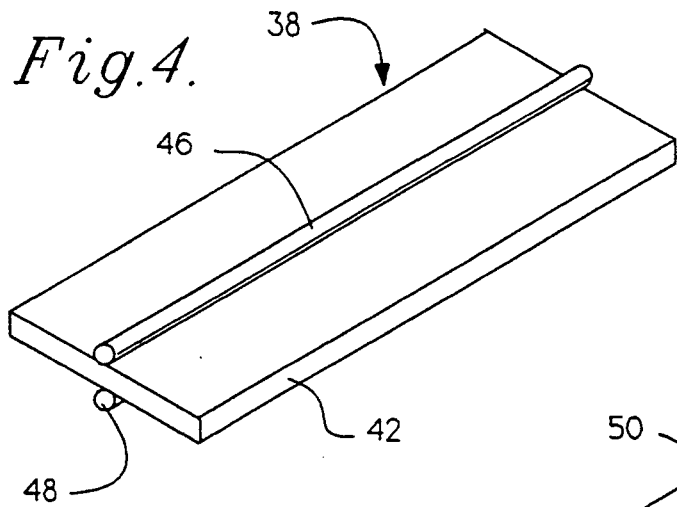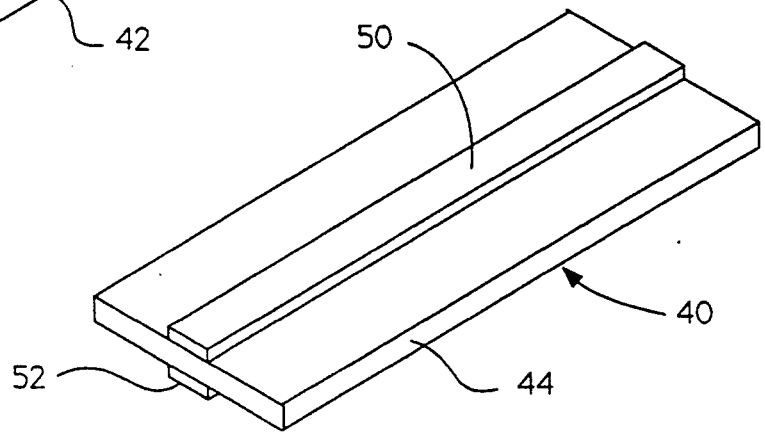

MAN-MACHINE INTERFACE FOR A JOINT MEASUREMENT SYSTEM

BACKGROUND OF THE INVENTION

1. Field of the Invention

The present invention relates generally to man-machine interfaces and more particularly to such an interface for measuring the mobility of human joints.

2. Description of the Background of the Invention

Devices and systems have been proposed to measure relative joint motion between two jointed skeletal segments. A number of systems are presently commercially available. Those systems are typically either glove-based systems of the type disclosed in U S. Pat. No. 4,414,537 to Grimes or exoskeletal systems of the type disclosed in U.S. Pat. No. 4,986,280 to Marcus, et al. Each of those systems has its limitations.

In the patent to Grimes, groups of sensors are fixed to the back of a glove which sensors are responsive to the flexing of various joints. Because the sensors are rigidly fixed to the glove, they are precisely located, but they are also subject to tensile forces whenever the joint is flexed. The tensile force added as a result of the flexing of the joint introduces an error into the signal produced by the sensor. Thus, the sensor does not provide an accurate signal representative of the degree of flex of the joint.

The device disclosed in Marcus, et al. is an exoskeletal device which is cumbersome to work with. Although that device does not suffer from the inaccuracies created by tensile forces acting on the sensors, the device of Marcus, et al. must be precisely positioned and rigidly strapped to the patient such that in certain cases involving injury or trauma, a device of that type simply cannot be used.

Accordingly, it is a general object of the present invention to provide an improved system for measuring human angular joint, limb, and body motion which substantially reduces or overcomes the foregoing problems. A more specific object of the invention is to provide the medical and scientific communities with a human body motion analysis input system that has the accuracy and data production speed useful for their needs and which has a man-machine interface that is accurate, easy to set up, calibrate, and use.

SUMMARY OF THE INVENTION

The present invention, in its broadest aspect, is directed to a man-machine interface comprising a sensor having first and second ends. The sensor carriers four transducers oriented such that the sensor is responsive to flex in two directions. An affixing mechanism, such as a glove or cloth strap, is provided for affixing the man-machine interface to a patient's body. A first mounting mechanism is provided for rigidly mounting the first end of the sensor to the affixing mechanism. A second mounting mechanism is provided for slidably mounting a second end of the sensor to the affixing mechanism. In that manner, flex in two directions can be sensed without adding any tensile forces to the sensor as a result of the joint being flexed.

According to another embodiment to the present invention, additional sensors responsive to flex in a single dimension may be used in combination with, or in place of, the sensors responsive to flex in two directions. For example, an affixing mechanism such as a glove may be provided which has single direction sensors mounted at the proximal-middle phalanx joints and two-direction sensors mounted at the metacarpal-proximal phalanx joints. Each of the sensors has one end which is rigidly mounted to the glove and a second end which is free to slide so as to relieve tensile forces. According to one embodiment to the present invention, a single mechanism is provided which allows for movement of the sliding end of both the single axis and dual axis sensors.

The provision of a man-machine interface of the type described above provides substantial advantages over interfaces found in the prior art. For example, tensile forces found in glove base systems with rigidly mounted sensors are eliminated. However the convenience of a glove based system over an exoskeletal device is maintained. Furthermore, flex is measured in two directions which provides a much more accurate indication of the flexibility of the joint or joints being measured. Additionally, the provision of onboard electronics, such as an analog to digital converter, allows the analog signals to be digitized as close to the sensors as possible thereby improving the accuracy of the system. Those, and other advantages and benefits, will become apparent from the Description Of A Preferred Embodiment hereinbelow.

BRIEF DESCRIPTION OF THE DRAWINGS

For the present invention to be easily understood and readily practiced, a preferred embodiment will now be described, by way of example only, in conjunction with the following figures in which:

FIGS. 1, 2, and 3 illustrate three types of two axis sensors;

FIGS. 4 and 5 illustrate two types of single axis sensors;

DESCRIPTION OF A PREFERRED EMBODIMENT

Figure 6:
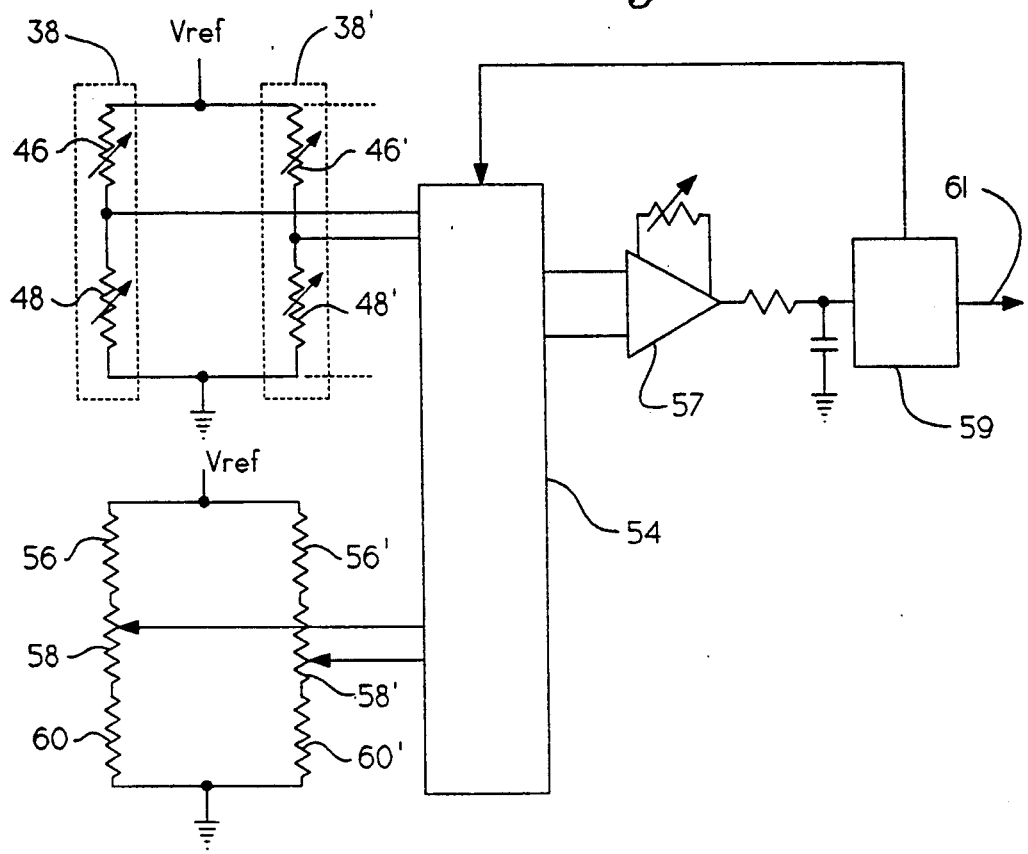
FIG. 6 is a diagram illustrating the electrical connection of two single axis sensors, or one dual axis sensor, to a circuit capable of producing a digital output signal representative of the degree of flex experienced by the sensors.

The man-machine interface of the present invention is built around a number of sensors of the type illustrated in FIGS. 1–5. The sensors illustrated in FIGS. 1–5 are constructed from highly flexible materials capable of flexing in conjunction with the flexing of a human joint. The sensors 10, 12, and 14 illustrated in FIGS. 1, 2, and 3, respectively, are each constructed of a highly flexible body 16, 18, and 20, respectively, having a cross section that is symmetric about a longitudinal axis in at least two orthogonal planes. The sensor bodies are then processed so that transducers in the form of strain sensing elements are attached along the bodies' longitudinal axis. For example, in FIG. 1, body 16 is provided with strain sensing elements in the form of wires 22, 24, 26, and 28. Those strain sensing elements 22, 24, 26, and 28 may similarly be located around body 18 as shown in FIG. 2. In FIG. 3, strain sensing elements 30, 32, 34, and 36 may be foil strain gauges or piezo-resistive gauges which are typically constructed with thick film, polymer ink having immersed conductive particles such as carbon, copper, or silver acting as a conductive agent. The sensors 10, 12, and 14, by virtue of the location of the strain gauges around the sensor's body, are capable of sensing two axis of bending. Thus, the sensors illustrated in FIGS. 1, 2, and 3 are capable of measuring flex in two directions. That method of construction also results in low sensitivity to bending when the sensors are aligned with the neutral axis of the bending beam. Thus, the present invention reduces cross-talk that commonly occurs with multiple axis sensors.

Another type of sensor, sensor 38 in FIG. 4 and sensor 40 in FIG. 5, is capable of measuring the angle between adjacent bones forming a joint. Sensors 38 and 40 are constructed of a highly flexible body of rectangular cross-section. The lessor dimension of the body lies parallel with the bending axis which is the axis in which flex is measured. The transducers may again be strain sensing elements such as wires 46 and 48 carried by body 42, or foil or piezo-resistive ink strain gauges 50 and 52 carried by body 44. In that manner, the sensors 38 and 40 illustrated in FIG. 4 and 5 are single axis sensors.

Turning to FIG. 6, an electrical schematic illustrates how single axis sensors, or dual axis sensors, may be connected to a circuit which produces a digital output signal representative of the strain, and hence the degree of flex, experienced by each sensor. Each sensor is represented in FIG. 6 by the strain gauges carried by the sensor. Thus, variable resistors 46 and 48 are representative of the strain gauge transducers 46 and 48 carried by sensor 38 in FIG. 4. Resistors 46' and 48' are representative of the transducers carried by a second sensor 38' of the same type as shown in FIG. 4. Those of ordinary skill in the art will recognize that any number of sensors, and hence any number of resistor pairs, may be connected between a reference voltage and ground as shown in FIG. 6.

Another resistive network is provided in which a resistor 56, a variable resistor 58, and a resistor 60 are connected in series between the reference voltage and ground. A second group of series connected resistors 56', 58', and 60' are also connected between the reference voltage and ground. Those of ordinary skill in the art will recognize that for every sensor, i.e., for every resistor pair 46, 48, there is a corresponding series connected group of resistors 56, 58, and 60.

A multiplexer 54 connects the sensor resistors 46 and 48 to the series connected resistors 56, 58, 60 so as to provide a balanced bridge. Any unbalance in the bridge is multiplied by an amplifier 57 and input to a microprocessor 59. The microprocessor 59 digitizes the analog signal to thereby produce a digital output signal representative of the unbalance of the bridge formed by resistors 46, 48, 56, 58, and 60. Thus, that digital signal is representative of the flex sensed by the sensor 38.

After the signal produced by strain gauge resistors 46 and 48 has been digitized, the processor 59 controls the multiplexer 54 to connect an output signal from a bridge formed of resistors 46', 48', 56', 58', and 60' to amplifier 57. Again, any unbalance is amplified, input to microprocessor 59, and digitized to produce an output signal representative of the flex experienced by sensor 38'. The microprocessor 59 continues to control multiplexer 54 until all of the balanced bridges have been checked and the output signals digitized. The digitized output signals may be stored within microprocessor 59 or output on a conductor 61.

Figure 7:
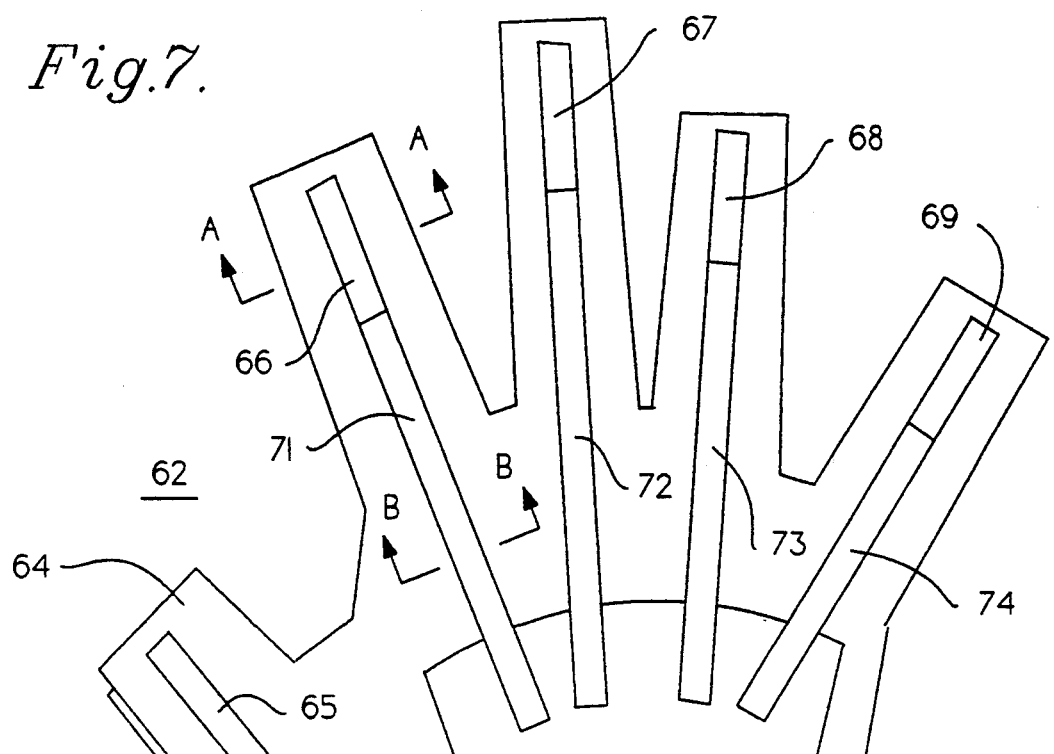
FIG. 7 is a diagrammatic representation of a plurality of single axis and double axis sensors mounted on a glove.
Figure 7A:
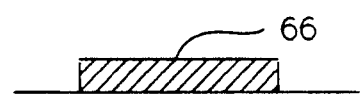
FIGS. 7A, 7B, and 7C are cross-sectional views taken at various positions in FIG. 7 to illustrate the type of sensor used at that location.
Figure 9:
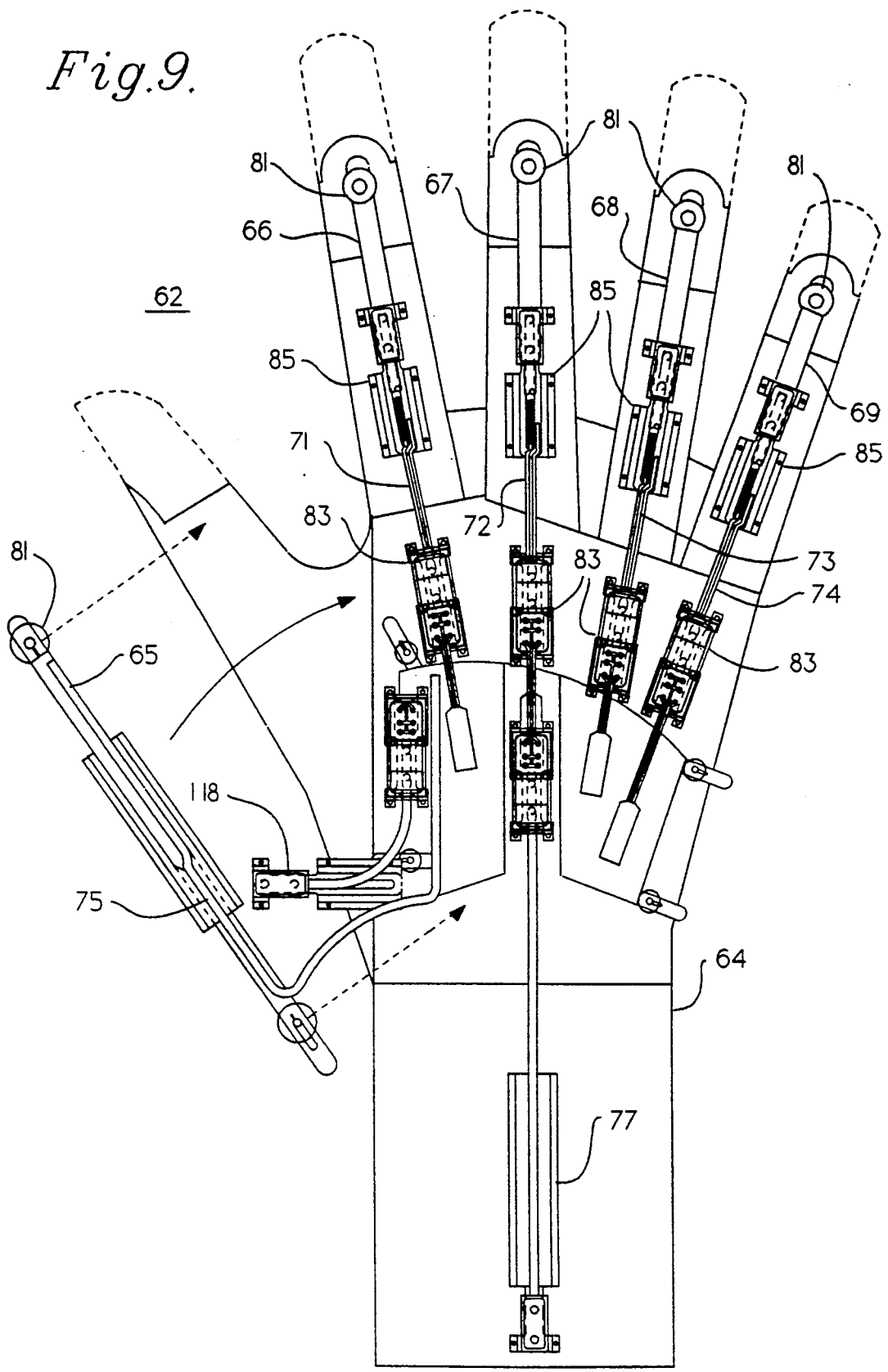
FIG. 9 illustrates a glove having a plurality of single axis and double axis sensors mounted thereon.

The sensors illustrated in FIGS. 1-5 and the circuit illustrated in FIG. 6 may be combined to construct a man-machine interface 62 of the type illustrated in FIG. 7, diagrammatically, and in FIG. 9, which is a top plan view. The man-machine interface is constructed of an affixing mechanism, which in FIGS. 7 and 9 takes the form of a partial glove 64, i.e. a glove without finger tips. A plurality of single axis sensors 65–69 are carried on partial glove 64 so as to be positioned over the joint between the proximal phalanx bones and the middle phalanx bones. As seen more clearly in FIG. 7A, which is a cross-sectional view of sensor 66, sensors 65–69 may be single axis sensors of the type illustrated in either FIGS. 4 or 5.

Figure 7B:
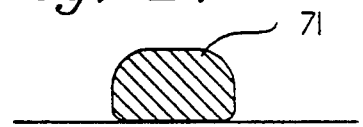
Figure 7C:
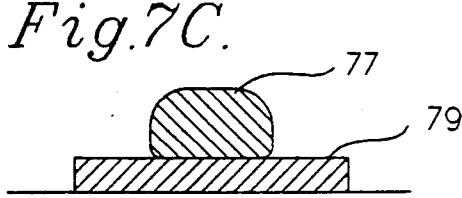

Partial glove 64 carries a plurality of sensors 71–75 which are positioned to span the joint between the metacarpal bones and the proximal phalanx bones. As seen in FIG. 7B, which is a cross-sectional view of sensor 71, sensors 71–75 are dual axis sensors of the type illustrated in any of FIGS. 1-3. Finally, the partial glove 64 carries a sensor 77 positioned to monitor movement of the wrist joint. The sensor 77, shown in cross-section and FIG. 7C, is seen to be of the type illustrated in any of FIGS. 1-3. The sensor 77 may additionally be mounted on a flexible circuit board 79.

Figure 8:
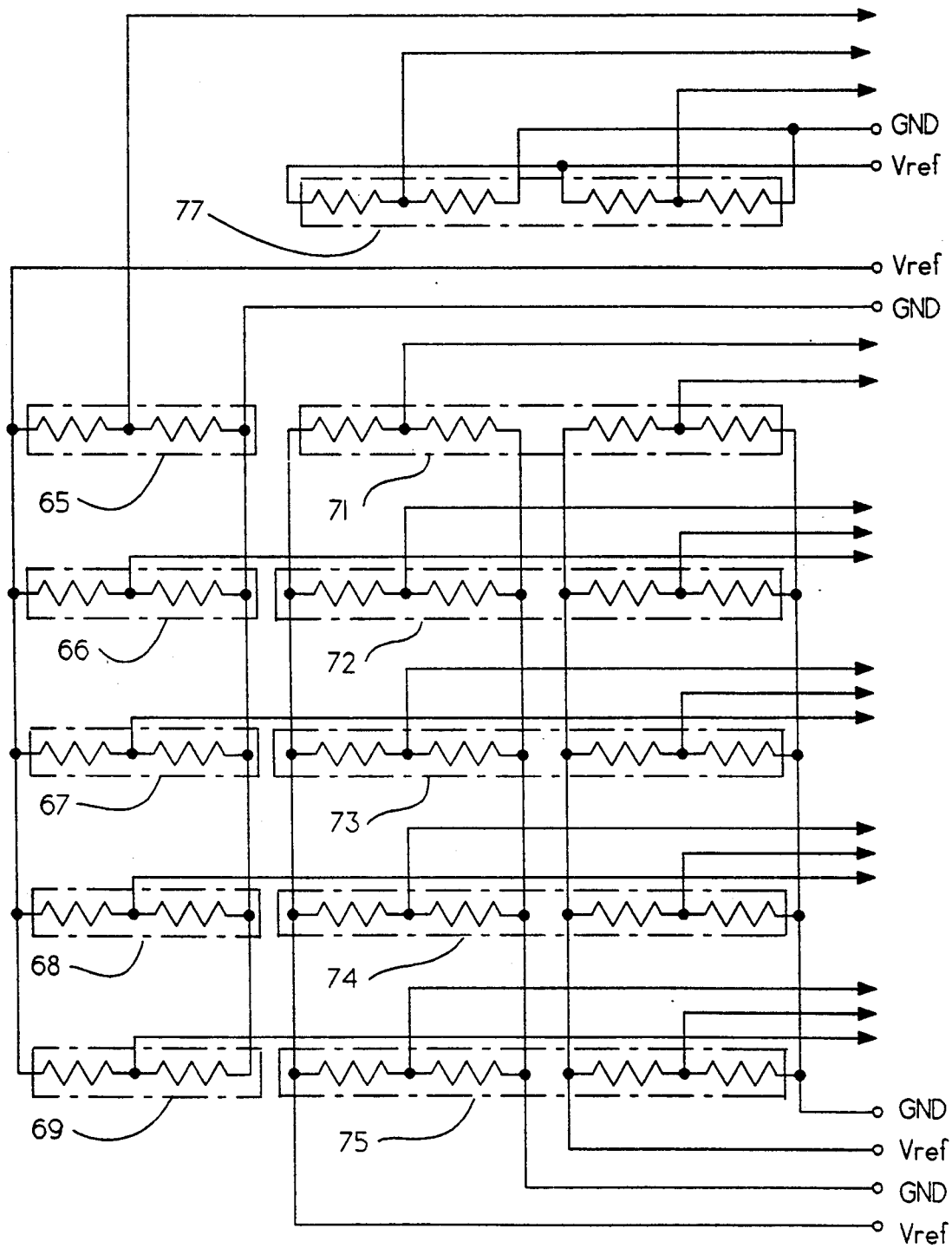
FIG. 8 is an electrical schematic of the sensors of the glove shown in FIG. 7.

The sensors carried by partial glove 64 may be electrically interconnected as shown in FIG. 8. Each of the single axis sensors 65–69 is connected between a reference voltage and ground so that an output signal is available at the junction between the two resistive elements forming the sensor. In a similar fashion, each of the dual axis sensors 71–75 and 77 has each resistor pair within each sensor connected in series between a reference voltage and ground, with an output signal being available at the junction between the two resistor elements. In that manner, a plurality of output signals is available which may be input to a circuit of the type illustrated in FIG. 6. The multiplexer 54, amplifier 57, and microprocessor 59 may be carried by flexible circuit board 79. Signals produced by the various sensors, which are representative of the flexing of the joint which that sensor spans, are digitized right on the glove. Digitizing the signal close to the source of the signal's production, and transmitting a digital rather than an analog signal, increases the accuracy of the system. Those of ordinary skill in the art will recognize, however, that the analog output signals may be input to a circuit of the type illustrated in FIG. 6 housed in a device carried on a belt, or positioned on a tabletop, provided that appropriate electrical connections are provided. However, as previously mentioned, the preference is to digitize the signals as close to the source of the signals as possible.

Figure 14:
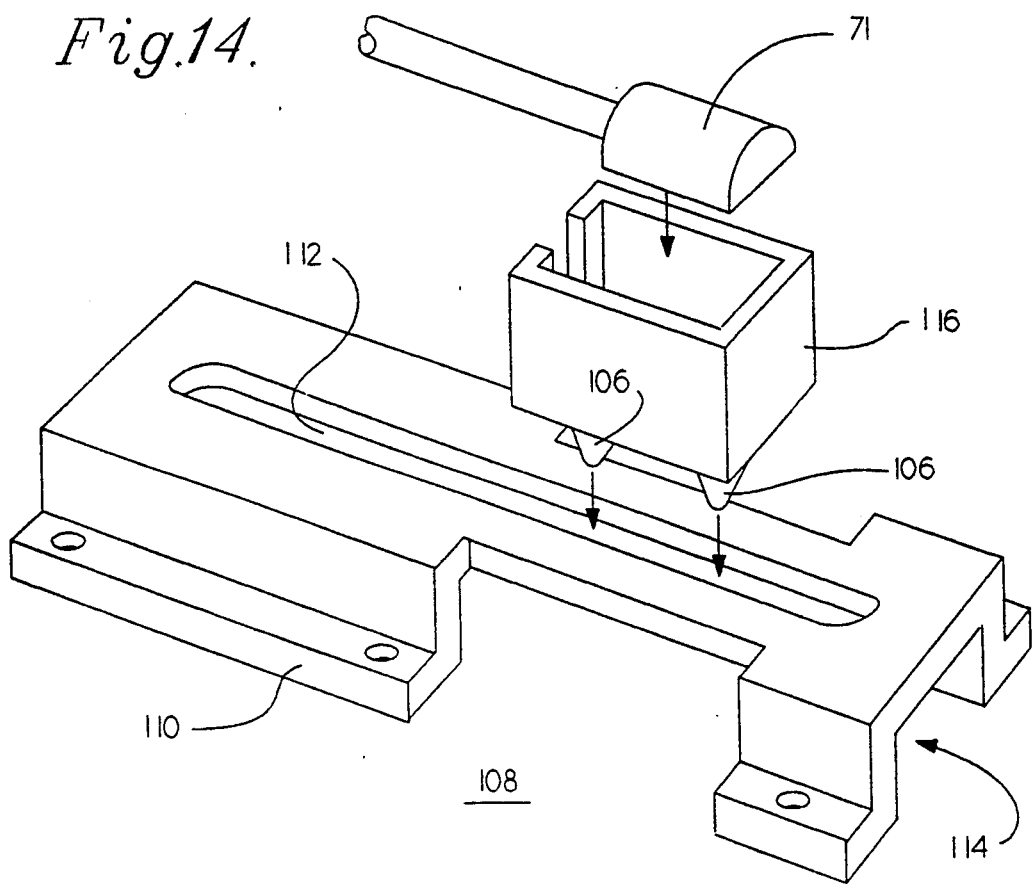
FIGS. 14 and 15 illustrate the movable ends of a single axis sensor and a double axis sensor.
Figure 15:
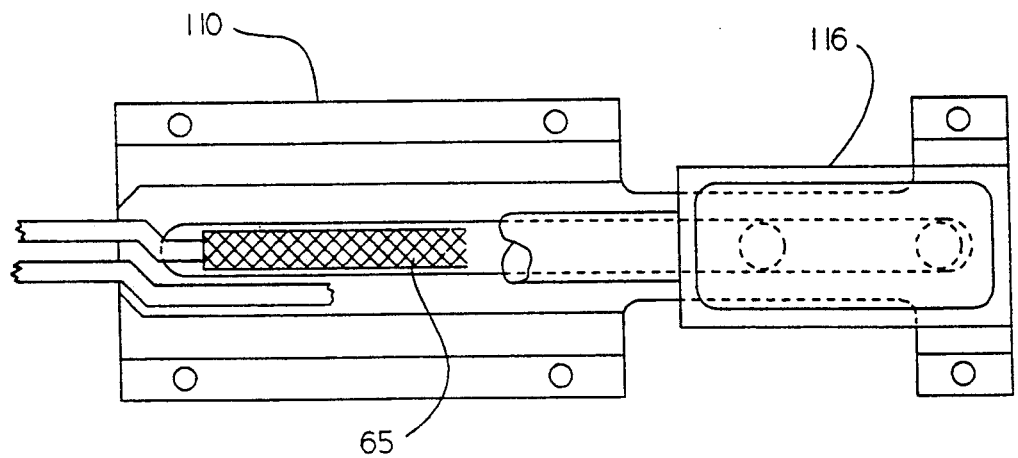

An important aspect of the present invention is the mechanism for mounting the various sensors to the affixing mechanism. The various mounting mechanisms are illustrated in FIG. 9, and are shown in greater detail in FIGS. 10-15. Referring first to FIG. 9, each of the single axis sensors 65-69 has a first fixed end 81 which is rigidly attached to the partial glove 64. All of the fixed ends 81 are identical in construction and operation such that only one need be discussed in detail. That discussion will take place in conjunction with FIGS. 10 and 11. Each of the dual axis sensors 71-75 has fixed end 83 which is rigidly connected to the partial glove 64. Each of the fixed ends 83 is identical in construction and operation such that only one need be described in detail. That description will take place in conjunction with FIGS. 12 and 13. A combination joint 85 provides a sliding attachment for the second end of each of the single axis sensors 65-69 and a sliding attachment for the second end of each of the dual axis sensors 71-75. Each of the combination joints 85 is identical in construction and operation such that only one need be described. That description will take place in conjunction with FIGS. 14 and 15.

Figure 10:
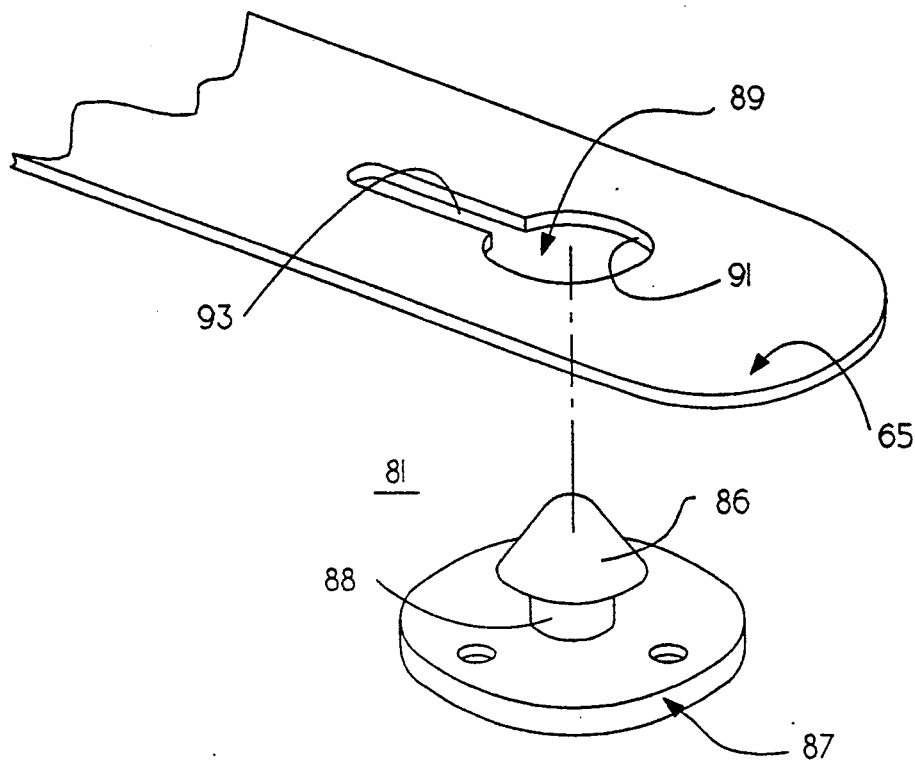
FIGS. 10 and 11 illustrate the fixed end of a single axis sensor.
Figure 11:
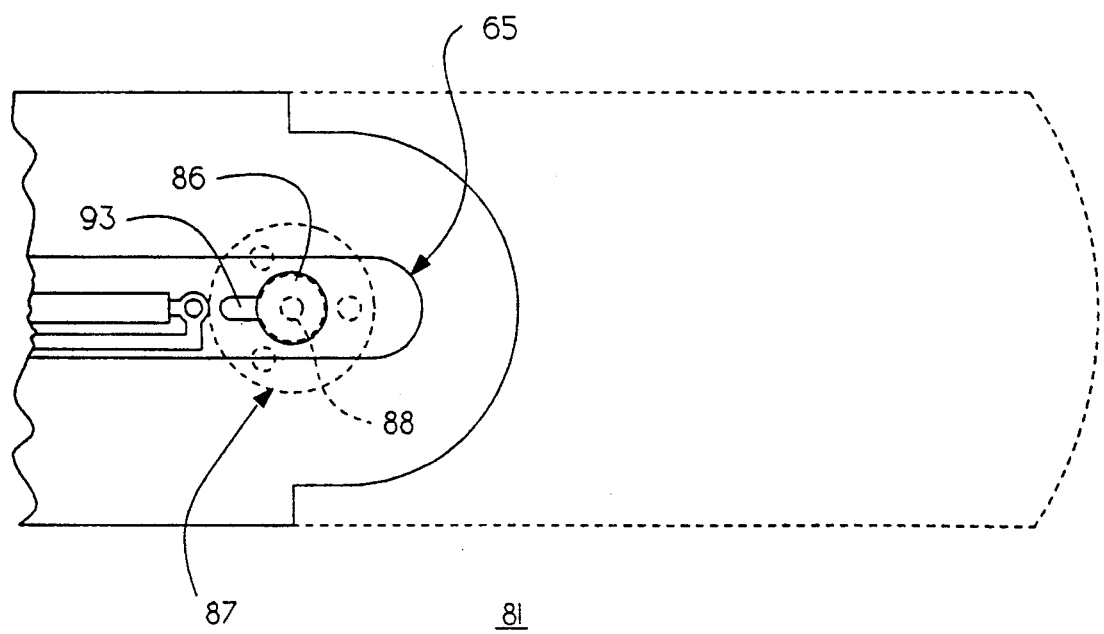

The fixed end 81 of the single axis sensors is illustrated in greater detail in FIGS. 10 and 11. In FIG. 10, a tie down button 87 is provided. The tie down button 87 has a plurality of apertures by which the tie down button 87 may be rigidly attached to the partial glove 64. The tie down button 87 has an enlarged head portion 86 carried by a shaft portion 88. The single axis sensor 65 is provided at a first end thereof with a button hole having a large portion 91 sized to fit over the head portion 86. The button hole 89 is also provided with a narrow portion 93 so that after the large portion 91 is fitted over tie down button 87, movement of sensor 65 to the right as illustrated in FIG. 10 will cause the narrow portion 93 to engage shaft portion 88. The single axis sensor 65 is shown engaging the tie down button 87 in FIG. 11. In that manner, the first end 81 of the sensor 65 is rigidly fixed to the partial glove 64.

Figure 13:
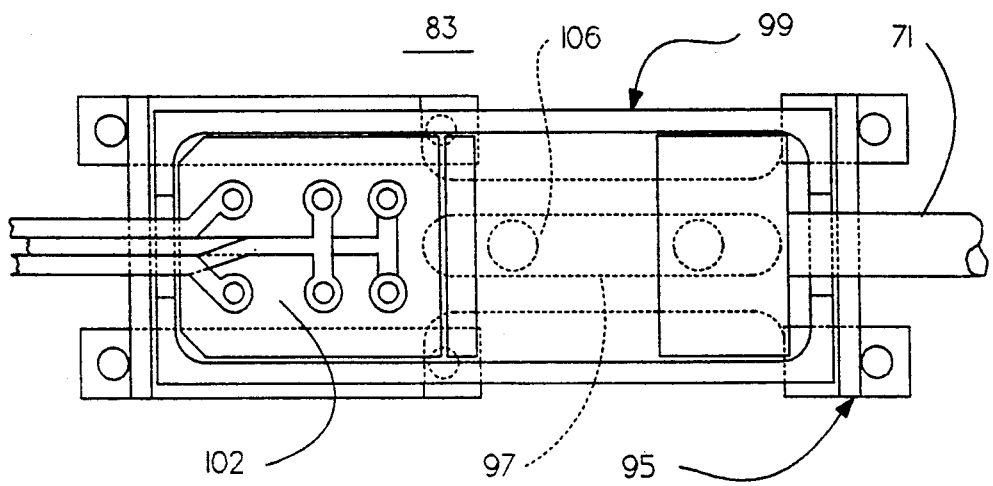
FIGS. 12 and 13 illustrate the fixed end of a double axis sensor.
Figure 12:
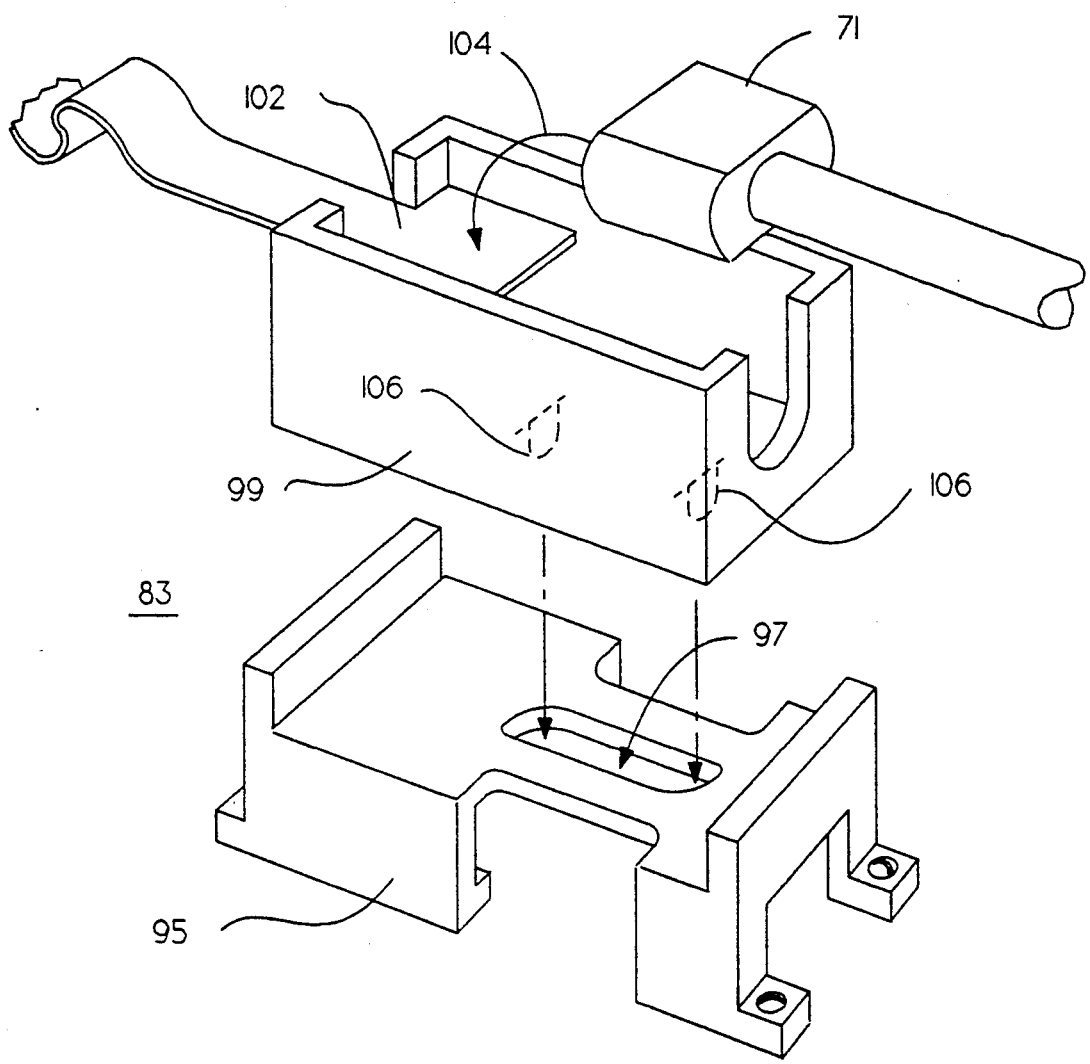

The fixed end 83 of dual axis sensors 71-75 is illustrated in FIGS. 12 and 13. The mechanism illustrated in FIGS. 12 and 13 is comprised of a clamp member 95. The clamp member 95 has a plurality of apertures by which the clamp member 95 may be rigidly attached to the partial glove 64. The clamp member 95 has a groove 97 formed in the upper surface thereof. The mechanism shown in FIG. 12 also has a sensor retainer 99. The sensor retainer 99 receives and holds a first end of the sensor 71. The sensor retainer 99 also receives and retains a flexible, printed circuit board (PCB) wire pad 102. Sensor wires 104 from sensor 71 may be connected to the flexible PCB wire pad 102. The sensor retainer 99 carries a pair of snaps or tabs 106, shown in phantom in FIG. 12, on the bottom portion thereof. The snaps 106 are positioned and sized to fit within groove 97 so as to rigidly hold sensor retainer 99 within clamp 95. A top view of sensor retainer 99 snapped into clamp 95 is illustrated in FIG. 13. In that manner, the first end of each of the dual axis sensors is rigidly connected to the partial glove 64.

A single mechanism 108 provides the sliding connection between the second end of the single axis sensors 65-69 and the second end of the dual axis sensors 71-75 and the partial glove 64. The mechanism 108 thus provides the function of the combination joint 85 illustrated in FIG. 9. The mechanism 108 is comprised of a clamp/slide member 110. The clamp/slide member 110 has a groove 112 formed in the top thereof similar to groove 97 of clamp 95, but of much greater length. The clamp/slide member 110 is provided with a plurality of apertures so that it may be rigidly attached to the partial glove 64. The clamp/slide member 110 is constructed to have an inverted U-shape thereby forming a tunnel portion 114. The mechanism 108 is also comprised of a sensor retainer 116 similar to sensor retainer 99. Sensor retainer 116 receives and retains the second end of dual axis sensor 71. Sensor retainer 116 need not be configured to retain a flexible printed circuit board as is sensor retainer 99.

Sensor retainer 116 is provided with snaps or tabs 106 formed in the bottom thereof. Snaps 106 are sized to fit within groove 112, and because the length of the groove 112 is much larger than the distance between snaps 106, tensile forces acting on sensor 71 may be relieved by movement of sensor retainer 116 relative to clamp/slide member 110. Sensor retainer 116 is thus slidably connected to clamp/slide 110 by virtue of tabs 106. The second end of single axis sensor 65 fits within tunnel 114. Tunnel 114 restricts movement of the second end of the sensor 65 to one direction. Thus, whenever sensor 65 is subjected to tensile forces, those forces may be relieved by second end 65 sliding within tunnel 114. The sensor retainer 116 is shown snapped in place in clamp/slide member 110 in FIG. 15. In that manner, the present invention provides a unique mechanism 108 which provides a mechanism for the second end of both the dual axis sensor and the single axis sensor to be slidably connected to the partial glove 64.

Returning to FIG. 9, the sensor 77 may be similarly connected such that its first end is rigidly connected to the partial glove 64 while its second end is slidably connected to the partial glove 64. In that manner, tensile forces experienced by wrist sensor 77 may be relieved.

The partial glove 64 is provided with an output port 118. The type of signal available at output port 118 will depend upon the electronics carried by partial glove 64. In the event that partial glove 64 carries a multiplexer, processor, and analog to digital converter, then the signals available at output port 118 will be digital signals representative of the degree of flex experienced by each of sensors. If such electronics are not carried by partial glove 64, then the signals available at output port 118 will be analog signals representative of the degree of flex experienced by each of the sensors. Those analog signals may be input to an interface device containing the type of electronics previously described above in conjunction with the glove. The signals available at output port 118 may be input to any computer running, for example, commercial instrumentation software. Those of ordinary skill in the art will recognized that a personal computer running commercially available instrumentation software, such as LabView ® by National Instruments or SoftPanels ® by GW Instruments, transforms a personal computer into a data collection system. The digital signals available at output terminal 118 may thus be collected and stored in accordance with the protocol of the program in use.

The man-machine interface of the present invention thus represents a substantial advance over the art. The accuracy found in exoskeletal systems is reproduced in a glove-based system by allowing tensile forces experience by the sensors to be relieved. Thus, the signals produced by the sensors more accurately represent the degree of flex experienced by the sensor. By maintaining the glove-based system, the convenience of affixing the man-machine interface to a patient is retained. Further, by digitizing the signals closer to their source, accuracy is enhanced.

Those of ordinary skill in the art will recognize that many variations of the present invention are possible. For example, the affixing mechanism need not be a glove. The affixing mechanism may take other shapes or may simply be strips of material provided with Velcro which may be wrapped around a joint, for example, an ankle or elbow joint. Further, it is anticipated that the electronics carried by the glove could be carried in a separate component clipped on a belt or otherwise conveniently located close to the glove. Those, and all such modifications and variations, are intended to be covered by the foregoing description and the following claims.

What is claimed is:

1. A man-machine interface comprising:
   glove means, sized to fit on a hand, for carrying a plurality of sensors;
   a plurality of single axis sensors each having a first end and a second end, each single axis sensor carrying two electrical strain gauge means oriented about each single axis sensor such that each said single axis sensor is responsive to flex in one direction;
   a plurality of double axis sensors each having a first end and a second end, each double axis sensor carrying four electrical strain gauge means oriented about each double axis sensor such that each double axis sensor is responsive to flex in two directions;
   a plurality of first mounting means for rigidly mounting said first ends of said double axis sensors to said glove means;
   a plurality of second mounting means rigidly attached to said glove means;
   a plurality of sensor retainer means for slidably mounting said second ends of said double axis sensors to said plurality of second mounting means, said plurality of first and second mounting means positioned on said glove means such that each double axis sensor is positioned over the joint between the metacarpal bone and the proximal phalanx bone of each finger of the hand;
   a plurality of third mounting means for rigidly connecting said first ends of said single axis sensors to said glove means; and
   wherein said plurality of second mounting means slidably receives said second ends of said single axis sensors, said plurality of second and third mounting means positioned on said glove means such that each single axis sensor is positioned over the joint between the proximal phalanx bone and the middle phalanx bone of each finger of the hand.

2. The man-machine interface of claim 1 wherein said glove means covers the wrist, and further comprising an additional double axis sensor carrying four electrical strain gauge means oriented about said additional double axis sensor such that said additional double axis sensor is responsive to flex in two directions, and wherein said additional double axis sensor is connected to said glove means and positioned to monitor movement of the wrist.

3. A man-machine interface, comprising:
   a sensor having first and second ends, said sensor carrying four electrical strain gauge means oriented about said sensor such that said sensor is responsive to flex in two directions;
   affixing means for affixing said man-machine interface to a body;
   first mounting means for rigidly mounting said first end of said sensor to said affixing means;
   second mounting means rigidly attached to said affixing means; and
   sensor retainer means for slidably mounting said second end of said sensor to said second mounting means.

4. The man-machine interface of claim 3 additionally comprising:
   a second sensor having first and second ends, said second sensor carrying two electrical strain gauge means oriented about said sensor such that said sensor is responsive to flex in one direction;
   third mounting means for rigidly connecting said first end of said second sensor to said affixing means; and
   wherein said second mounting means slidably receives said second end of said second sensor.

5. The man-machine interface of claim 4 wherein said affixing means includes a glove.

6. The man-machine interface of claim 5 additionally comprising circuit means responsive to said sensors for producing digital signals representative of the flex experienced by each of said sensors.

7. The man-machine interface of claim 3 wherein said sensor has a circular cross-section.

8. The man-machine interface of claim 7 wherein said sensor has a hollow center and said four electrical strain gauge means are positioned ninety degrees from each other.

9. The man-machine interface of claim 3 wherein said sensor has a square cross-section.

10. The man-machine interface of claim 9 wherein said sensor has a hollow center and said four electrical strain gauge means are positioned one on each side of said sensor.

11. The man-machine interface of claim 3 wherein said sensor carries said electrical strain gauge means on an exterior surface thereof.

12. The man-machine interface of claim 3 wherein said sensor carries said electrical strain gauge means within the walls thereof.

13. The man-machine interface of claim 3 wherein said electrical strain gauge means are constructed of wire.

14. The man-machine interface of claim 3 wherein said electrical strain gauge means are constructed of piezo-resistive ink.

* * * * *

UNITED STATES PATENT AND TRADEMARK OFFICE
CERTIFICATE OF CORRECTION

PATENT NO. : 5,316,017
DATED : May 31, 1994
INVENTOR(S) : Glenn R. Edwards, Graham Lloyd, Marl L. Oberman It is certified that error appears in the above-indentified patent and that said Letters Patent is hereby corrected as shown below:

Col. 5, line 6, after "has" insert --a--

Signed and Sealed this

Twenty-seventh Day of December, 1994

Attest:

BRUCE LEHMAN

Attesting Officer     Commissioner of Patents and Trademarks